United States Patent
Kaufman et al.

(10) Patent No.: US 10,087,364 B2
(45) Date of Patent: Oct. 2, 2018

(54) METHOD OF STIMULATING A SUBTERRANEAN FORMATION WITH NON-SPHERICAL CERAMIC PROPPANTS

(71) Applicant: Baker Hughes, a GE company, LLC, Houston, TX (US)

(72) Inventors: Phillip B. Kaufman, Conroe, TX (US); D. V. Satyanarayana Gupta, The Woodlands, TX (US); Allan R. Rickards, Tomball, TX (US); Christopher J. Stephenson, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 14/713,703

(22) Filed: May 15, 2015

(65) Prior Publication Data
US 2015/0259593 A1  Sep. 17, 2015

Related U.S. Application Data

(60) Division of application No. 13/457,595, filed on Apr. 27, 2012, now Pat. No. 9,051,512, which is a continuation of application No. 13/114,766, filed on May 24, 2011, now Pat. No. 8,186,434, which is a continuation of application No. 12/013,775, filed on Jan. 14, 2008, now Pat. No. 7,950,455.

(51) Int. Cl.
*E21B 43/267* (2006.01)
*C09K 8/80* (2006.01)
*C09K 8/62* (2006.01)

(52) U.S. Cl.
CPC ............... *C09K 8/805* (2013.01); *C09K 8/62* (2013.01); *C09K 8/80* (2013.01); *E21B 43/267* (2013.01); *Y10T 428/2982* (2015.01)

(58) Field of Classification Search
CPC ... C09K 8/68; C09K 8/80; C09K 8/62; C09K 8/805; E21B 43/267; E21B 43/26; E21B 43/04
See application file for complete search history.

(56) References Cited

U.S. PATENT DOCUMENTS

| | | | | |
|---|---|---|---|---|
| 2006/0157243 A1* | 7/2006 | Nguyen | ............... | C09K 8/805 166/280.2 |
| 2007/0131424 A1* | 6/2007 | Fripp | ............... | C09K 8/80 166/280.2 |
| 2008/0217010 A1* | 9/2008 | Blackburn | ............... | C09K 8/62 166/280.2 |
| 2011/0083849 A1* | 4/2011 | Medvedev | ............... | C09K 8/665 166/280.1 |

* cited by examiner

*Primary Examiner* — Zakiya W Bates
(74) *Attorney, Agent, or Firm* — John Wilson Jones; Jones Delflache LLP

(57) ABSTRACT

Non-spherical particulates are useful in the stimulation of subterranean formations. A proppant pack composed of the non-spherical particulates exhibits greater porosity than a corresponding proppant pack composed of spherical particulates. In addition, the non-spherical particulates exhibit higher conductivity at higher stresses than spherical shaped particulates.

12 Claims, 2 Drawing Sheets

METHOD OF STIMULATING A SUBTERRANEAN FORMATION WITH NON-SPHERICAL CERAMIC PROPPANTS

This application is a divisional application of U.S. patent application Ser. No. 13/457,595 as filed Apr. 27, 2012, which is a continuation application of U.S. patent application Ser. No. 13/114,766 as filed May 24, 2011, now U.S. Pat. No. 8,186,434, which is a continuation application of U.S. patent application Ser. No. 12/013,775, now U.S. Pat. No. 7,950,455.

FIELD OF THE INVENTION

This invention relates to non-spherical well treating particulates and methods of using such particulates in the treatment of subterranean formations. In particular, this invention relates to non-spherical well treating particulates which may be at least partially filled with a chemical treatment agent and the use of such particulates in hydraulic fracturing and sand control methods, such as gravel packing, frac pack treatments, etc.

BACKGROUND OF THE INVENTION

Stimulation procedures often require the use of well treating materials having high compressive strength. In hydraulic fracturing, such materials must further be capable of enhancing the production of fluids and natural gas from low permeability formations. In a typical hydraulic fracturing treatment, fracturing treatment fluid containing a solid proppant is injected into the wellbore at high pressures. Once natural reservoir pressures are exceeded, the fluid induces fractures in the formation and proppant is deposited in the fracture, where it remains after the treatment is completed. The proppant serves to hold the fracture open, thereby enhancing the ability of fluids to migrate from the formation to the wellbore through the fracture. Because fractured well productivity depends on the ability of a fracture to conduct fluids from a formation to a wellbore, fracture conductivity is an important parameter in determining the degree of success of a hydraulic fracturing treatment. Choosing a proppant is critical to the success of well stimulation.

The prior art has been principally focused on the development of spherical well treating particulates. For example, manufactured ceramic proppants have been reported as requiring a sphericity value of about 0.70 or greater. See, for instance, Krumbein et al, Stratiography and Sedimentation, W.H. Freeman and Co., 1955. The requirement that well treatment particulates, such as proppants, be spherical particulates may be attributed to the perception that spherical particulates achieve the highest possible conductivity throughout the proppant pack and allow for the highest permeability for a uniform shape.

Proppants used in the art include sand, glass beads, walnut hulls, and metal shot as well as resin-coated sands, intermediate strength ceramics, and sintered bauxite; each employed for their ability to cost effectively withstand the respective reservoir closure stress environment. The relative strength of these various materials increases with their corresponding apparent specific gravity (ASG), typically ranging from 2.65 for sands to 3.6 for sintered bauxite. Unfortunately, increasing ASG leads directly to increasing degree of difficulty with proppant transport and reduced propped fracture volume, thereby reducing fracture conductivity.

More recently, ultra lightweight (ULW) materials have been used as proppants since they reduce the fluid velocity required to maintain proppant transport within the fracture, which, in turn, provides for a greater amount of the created fracture area to be propped. Such ULW proppants, like conventional heavier proppants, have the capability to effectively withstand reservoir closure stress environments while increasing fracture conductivity. While offering excellent compressive strength, ULW proppants often soften and loose their compressive strength especially at high temperature and high pressure downhole conditions. Alternatives have therefore been sought.

Improved well treating particulates have also been sought for use in the prevention of sand grains and/or other formation fines from migrating into the wellbore. When such migration occurs, such grains and fines typically reduce the rate of hydrocarbon production from the well. In addition, such grains and fines can cause serious damage to well tubulars and to well surface equipment.

Gravel packs are often used to control migration of particulates in such producing formations. A gravel pack typically consists of a uniformly sized mass of spherical particulates which are packed around the exterior of a screening device. Such screening devices, typically positioned in an open hole or inside the well casing, have very narrow openings which are large enough to permit the flow of formation fluid but small enough to allow the particulates to pass through. The particulates operate to trap, and thus prevent the further migration of, formation sand and fines which would otherwise be produced along with the formation fluid.

In order to be useful in gravel packing applications, such particulates must exhibit high strength and be capable of functioning in low permeability formations. While ULW well treating agents have been proposed for use in gravel packing applications to improve transport, placement, and packing efficiency, concerns exist however that ULW particulates do not demonstrate the chemical resistance properties required of particulates for use in gravel packing.

Alternative well treating agents have therefore been sought which exhibit high compressive strength and which may be used to improve packing efficiency, transport and placement of proppant in fracturing. It is further desired that such materials be useful in other oilfield treatment processes, such as sand control.

In addition, alternative proppants which are capable of increasing fracture width as well as conductivity are desired.

It is further desired that alternative well treatment particulates be capable of providing a chemical treatment agent to the wellbore and formation in order to inhibit deleterious conditions which may typically develop. Oilfield fluids (e.g., oil, gas, and water) are complex mixtures of aliphatic hydrocarbons, aromatics, hetero-atomic molecules, anionic and cationic salts, acids, sands, silts, clays and a vast array of other components. The nature of these fluids combined with the severe conditions of heat, pressure, and turbulence to which they are often subjected during retrieval, are contributory factors of unwanted deposition of substances which may be responsible for decreasing the permeability of the subterranean formation as well as reducing well productivity and shortening of the lifetime of production equipment. Such may include paraffin deposition (including the precipitation of wax crystals), formation of water-in-oil as well as oil-in-water emulsions, gas hydrate formation and corrosion and asphaltene precipitation. In order to rid such unwanted deposits and precipitates from wells and equipment, it is necessary to stop the production which is both time-consuming and costly.

An especially troublesome unwanted deposits are paraffin hydrocarbon waxes which tend to precipitate and crystallize at low temperatures, thereby causing oil to lose its fluidity. Over a range of temperatures, these paraffin wax crystals continue to aggregate and may even solidify the oil. This creates difficulties in transporting the petroleum fuel or crude oil through flow lines, valves, and pumps. Paraffin wax crystals are particularly problematic at lower temperatures and in colder climates where, as the temperature drops and approaches the crude oil's pour point, the transportation of crude oil becomes more difficult. Once out of solution, paraffin wax crystals often plug flow lines, production tubing, flow lines, screens and filters.

Various well treatment agents are often used in production wells to prevent the deleterious effects caused by the formation and precipitation of unwanted materials. For instance, pour point depressants and wax crystal modifiers have been used to change the nature of wax crystals that precipitate from the petroleum fuel or crude oil, thereby reducing the tendency of wax crystals to set into a gel.

It is essential that such well treatment agents be placed into contact with the oilfield fluids contained in the formation before such fluids enter the wellbore where deleterious effects are commonly encountered. Several methods are known in the art for introducing such well treatment agents into production wells. A principal disadvantage of such prior art methods is the difficulty in releasing the well treatment agent into the well over a sustained period of time. As a result, treatments must repeatedly be undertaken to ensure that the requisite level of well treatment agent is continuously present in the well. Such treatments result in lost production revenue due to down time.

Treatment methods are therefore sought for introducing well treatment agents into oil and/or gas wells wherein the well treatment agent may be released over a sustained period of time. It is desired that such methods not require continuous attention of operators over prolonged periods.

SUMMARY OF THE INVENTION

Non-spherical particulates are useful in stimulation of subterranean formations and have particular applicability as proppants in the fracturing of hydrocarbon-bearing formations as well as in sand control operations. The particulates may be porous or non-porous.

The volume and particle size of the non-spherical particulates may be selected so as to generate a close-packed structure of particulates. Such close-packed particulates significantly reinforce the strength (or modulus) of the composite. Stresses are transmitted through the packed particulates in communication with one another. As such, the non-spherical particulates demonstrate significantly improved stress tolerance.

In a preferred embodiment, the non-spherical particulates have a shape which is substantially oblong, elliptical or cylindrical. Such non-spherical shapes render higher conductivity at higher stresses than those evidenced with spherical shaped particulates. The non-spherical particulates have an aspect ratio less than or equal to 5.0:1.0, typically less than or equal to 2.5:1.0.

In some instances, the non-spherical particulates may exhibit greater permeability than spherical particulates. The apparent specific gravity of the non-spherical particulates defined herein may be from about 1.0 to about 4.0. However, the loose-packed bulk densities containing the non-spherical particulates may be from about 0.5 $g/cm^3$ to about 2.0 $g/cm^3$. The bulk density may be due to a loose-packed structure assumed by the non-spherical particulates.

The non-spherical particulates may be treated with a coating layer or glazing material. Such coating materials may be permeable or semi-permeable to fluids produced from the wellbore.

Use of the non-spherical particulates renders higher porosity to a proppant pack. For instance, the porosity of a proppant pack having a portion of spherical particulates substituted with non-spherical particulates has been seen to exhibit greater porosity at an equivalent bulk volume. The porosity of a proppant pack containing non-spherical particulates defined herein may range from about 45 to about 70 percent, more typically in the range of from about 50 to about 60 percent.

In another embodiment, the non-spherical particulates are non-porous and are hollow. Such non-spherical particulates are capable of being at least partially filled with a chemical treatment agent. For instance, the internal volume of the hollow cylindrical non-porous particulates may be up to about 70 percent by volume of the cylindrical proppant.

Suitable chemical treatment agents are those which are water-soluble or oil-soluble. Further such chemical treatments agents may those which are capable of being released into the formation by heat or mechanical stress. Suitable materials for such non-porous particulates are ceramics as well as organic polymeric materials, such as polyolefins.

Suitable chemical treatment agents include scale inhibitors, corrosion inhibitors, paraffin inhibitors, demulsifiers, gas hydrate inhibitors, flocculating agents, asphaltene dispersants as well as mixtures thereof.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
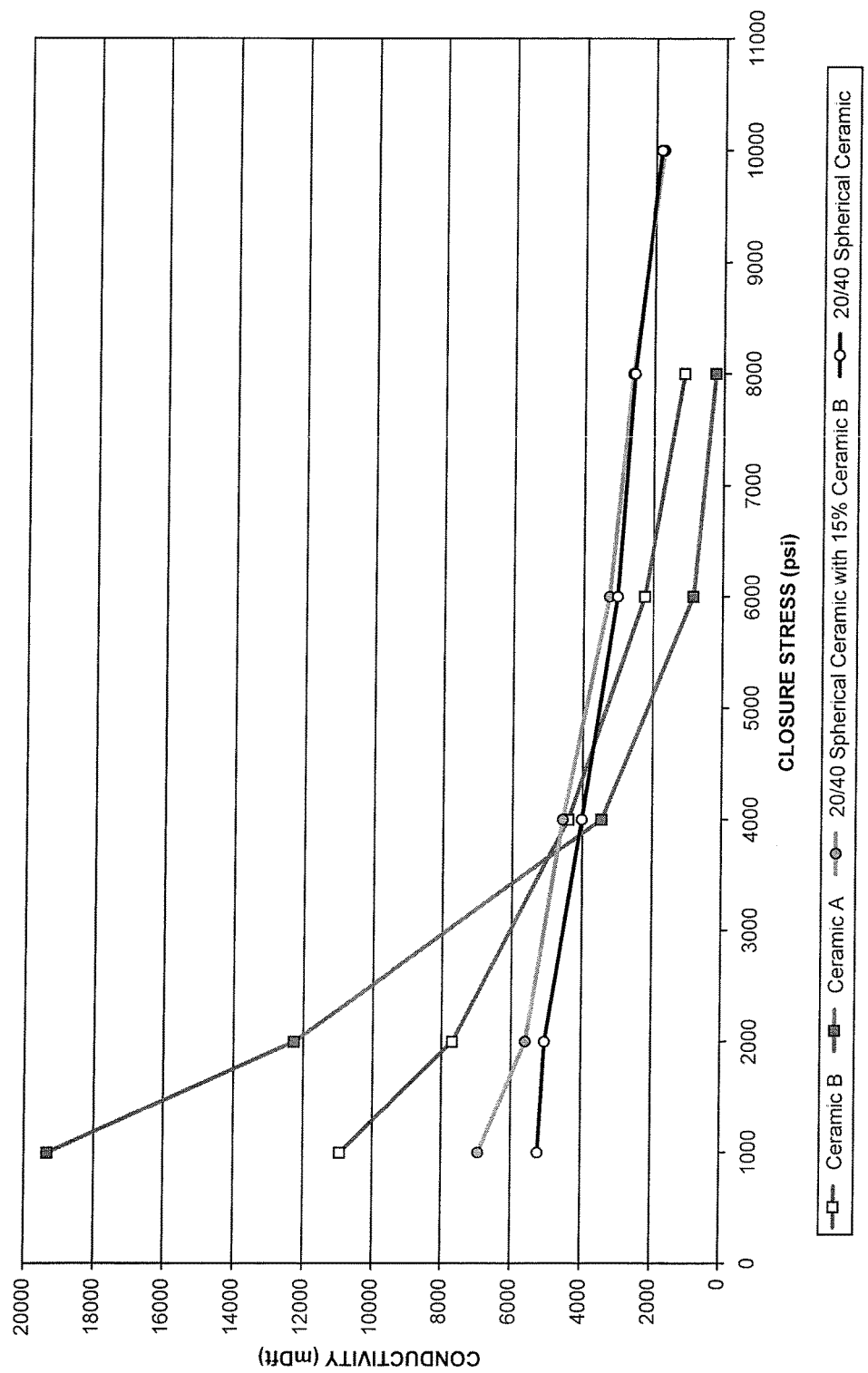
FIG. 1 shows conductivity data for proppant packs composed of non-spherical particulates including proppant packs composed of mixtures of spherical and non-spherical particulates.

The non-spherical particulates defined herein are typically lightweight and exhibit high strength. As such, they find particular applicability in stimulation and sand control methods, such as hydraulic fracturing and gravel packing.

The non-spherical particulates are principally used to substantially improve productivity in petroleum and gas production. They are especially useful at high temperature and high pressure downhole conditions. For instance, the non-spherical particulates may be used at temperatures at least up to about 450° F. and at a downhole pressure of at least up to about 20,000 psi.

In particular, the non-spherical particulates find particular applicability in the fracturing of hydrocarbon-bearing formations or water injection wells since they exhibit substantial improvement in overall system performance. The non-spherical particulates may be introduced into the wellbore at concentrations sufficient to achieve a partial monolayer of proppant in the fracture. The non-spherical particulates are further ideally suited for use in normal fracture packs (as well as sand control packs).

The non-spherical particulates are further capable of preventing sand grains and/or other formation fines from migrating into the wellbore in sand control applications.

In such applications, at least a portion of the non-spherical particulates is placed adjacent the subterranean formation to form a fluid-permeable pack. The pack is capable of reducing or substantially preventing the passage of formation particles from the subterranean formation into the wellbore. At the same time, formation fluids from the subterranean formation are permitted to pass into the wellbore.

The volume and particle size of the non-spherical particulates may be selected so as to generate a close-packed structure of particulates. Such close-packed particulates significantly reinforce the strength (or modulus) of the composite. Stresses are transmitted through the packed particulates in communication with one another. As such, the non-spherical particulates demonstrate significantly improved stress tolerance. In a preferred embodiment, the non-spherical particulates have a shape which is substantially oblong, elliptical or cylindrical. Such non-spherical shapes render higher conductivity at higher stresses than those evidenced with spherical shaped particulates. The non-spherical particulates have an aspect ratio less than or equal to 5.0:1.0, typically less than or equal to 2.5:1.0. The shape of the non-spherical particulates may be selected based on anticipated downhole conditions including the width of the anticipated fracture. The non-spherical particulates deform with stress and yet are sufficiently strong to be used on their own at high pressures, such as a closure stress in excess of 4,000 psi, when the used in a partial monolayer hydraulic fracturing application.

In some instances, the non-spherical particulates may exhibit greater permeability than spherical particulates. The apparent specific gravity of the non-spherical particulates defined herein may be from about 1.0 to about 4.0. However, the loose-packed bulk densities containing the non-spherical particulates may be from about 0.5 g/cm$^3$ to about 2.0 g/cm$^3$. The bulk density may be due to a loose-packed structure assumed by the non-spherical particulates.

The non-spherical particulate may be composed of untreated or treated ceramics, inorganic oxides or organic polymeric materials. Suitable particulates include aluminosilicates, silicon carbide, alumina and other silica-based materials. Further, the non-spherical particulates may be a naturally occurring or manufactured or engineered material. Examples of non-natural particulate materials for use in the invention include, but are not limited to, plastics, nylon and porous ceramic particles, such as fired kaolinitic particles, as well as partially sintered bauxite. The particulates may further be natural ceramic materials, such as lightweight volcanic rocks, like pumice, as well as perlite and other porous "lavas" like porous (vesicular) Hawaiian Basalt, Virginia Diabase and Utah Rhyolite. Suitable polymeric materials for the non-spherical particulate include thermosetting resins and plastics, such as polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, a melamine formaldehyde resin or a polyamide. Composite materials made from these polymeric materials may also be used.

Further acceptable non-spherical particulates may include ground or crushed shells of nuts such as walnut, pecan, almond, ivory nut, brazil nut, etc.; ground or crushed seed shells (including fruit pits) of seeds of fruits such as plum, peach, cherry, apricot, etc.; ground or crushed seed shells of other plants such as maize (e.g., corn cobs or corn kernals), etc. processed wood materials such as those derived from woods such as oak, hickory, walnut, poplar, mahogany, etc. including such woods that have been processed by grinding, chipping, or other form of particalization. Such materials may be chipped, ground, crushed, or otherwise processed to produce the non-spherical particulate material.

In addition to being combined with spherical particulates, a mixture of two or more non-spherical particulates (with or without spherical particulates) may further be used.

A coating, which may be permeable or semi-permeable to fluids produced from the wellbore, may be applied to the non-spherical particulates as a coating layer or glazing material. Such layers are especially applicable where the non-spherical particulate is porous. The coating or glazing is preferably applied to the circumference of the non-spherical particulates. The coating or glazed material may be used as a sealant to prevent entry of the carrier fluid or other wellbore fluids into the core of the particulates. The amount of coating, when present, is typically from about 0.5 to about 10% by weight of the coated non-spherical particulate.

The coating may be applied to the non-spherical particulates using any suitable method known in the art. For example, the process, as disclosed in U.S. Pat. No. 7,135,231, may consist of heating the non-porous particulates to a temperature between from about 93° C. to about 425° C., adding the heated particulates to a mixing apparatus, if necessary, and then applying a coupling agent, such as a polyamine, onto the surface of the particulates. A resin coating may then be sputtered onto at least a portion of the surface of the particulates. If additional protection is necessary, the process can include sputtering additional resin coats onto the particulates in an incremental manner, such that the resultant coated particulate has a plurality of interleaved resin coats fully coating the particulates.

In another embodiment, the non-spherical particulates may be heated to a temperature between from about 93° C. to about 425° C. and a resinous coating then applied while the particulates are being cooled.

Suitable coatings include phenolic resins, phenol-formaldehyde resins, melamine-formaldehyde resins, polyurethanes, carbamate resins, epoxy resins, polyamides, polyolefins, such as polyethylene, polystyrene and a combination thereof. In a preferred embodiment, the coating is an epoxy resin, phenol formaldehyde resin or a urethane resin.

A proppant pack composed at least in part of the non-spherical particulates discussed herein exhibit greater porosity than a proppant pack, of equivalent bulk volume having spherical particulates in place of the non-spherical particulates. Further, the porosity of a proppant pack having a portion of spherical particulates substituted with non-spherical particulates exhibits greater porosity at equivalent bulk volumes. The porosity of a proppant pack containing non-spherical particulates defined herein may range from about 45 to about 75 percent, more typically in the range of from about 50 to about 60 percent. Consistent with the fact that the non-spherical particulates exhibit greater porosity than spherical particulates, proppant packs containing non-spherical particulates exhibit enhanced permeability at elevated stresses.

In another embodiment, the non-spherical particulates are non-porous and are hollow. Such non-spherical particulates are capable of being at least partially filled with a chemical treatment agent. For instance, the internal volume of the hollow cylindrical non-porous particulates may be up to about 70 percent by volume of the cylindrical proppant.

In another embodiment, the non-spherical particulates are non-porous and are hollow. Such non-spherical particulates are capable of being at least partially filled with a chemical treatment agent. For instance, the internal volume of the hollow cylindrical non-porous particulates may be up to about 70 percent by volume of the cylindrical proppant.

When the non-spherical particulates are employed in deep water environments having high closure stresses, the ASG of the non-spherical particulates is preferably between from about 1.0 to about 4.0. In such applications, fracturing may be conducted at closure stresses greater than about 1500 psi and at temperatures ranges between ambient and 260° C. As a result, the non-spherical particulates function well in ultra deep, hot, high closure stress applications.

For use in less harsh environments, the ASG of the non-spherical particulates is generally less than or equal to 2.0, generally between from about 1.05 to about 2.0.

The non-spherical particulates are generally introduced into the wellbore with a carrier fluid. Any carrier fluid suitable for transporting the particulates into the wellbore and/or subterranean formation fracture in communication therewith may be employed including, but not limited to, carrier fluids including a brine, salt water, unviscosified water, fresh water, potassium chloride solution, a saturated sodium chloride solution, liquid hydrocarbons, and/or a gas such as nitrogen or carbon dioxide. In a preferred embodiment, the carrier fluid is unviscosified water or brine.

The carrier fluid may be gelled, non-gelled or have a reduced or lighter gelling requirement. The latter may be referred to as "weakly gelled", i.e., having minimum sufficient polymer, thickening agent, such as a viscosifier, or friction reducer to achieve friction reduction when pumped downhole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. The non-gelled carrier fluid typically contains no polymer or viscosifer.

The use of a non-gelled carrier fluid eliminates a source of potential packing and/or formation damage and enhancement in the productivity of the well. Elimination of the need to formulate a complex suspension gel may further mean a reduction in tubing friction pressures, particularly in coiled tubing and in the amount of on-location mixing equipment and/or mixing time requirements, as well as reduced costs. In one embodiment employing a substantially neutrally buoyant particulate and a brine carrier fluid, mixing equipment need only include such equipment that is capable of (a) mixing the brine (dissolving soluble salts), and (b) homogeneously dispersing in the substantially neutrally buoyant particulate.

The non-spherical particulates may be advantageously pre-suspended as a substantially neutrally buoyant particulate and stored in the carrier fluid (e.g., brine of near or substantially equal density), and then pumped or placed downhole as is, or diluted on the fly. The term "substantially neutrally buoyant" refers to non-spherical particulates that have an ASG sufficiently close to the ASG of the selected ungelled or weakly gelled carrier fluid (e.g., ungelled or weakly gelled completion brine, other aqueous-based fluid, slick water, or other suitable fluid) which allows pumping and satisfactory placement of the particulate using the selected ungelled or weakly gelled carrier fluid.

Suitable chemical treatment agents for at least partially filling the non-spherical particulates are those which are water-soluble or oil-soluble. Further such chemical treatments agents may those which are capable of being released into the formation by heat or mechanical stress. Suitable materials for such non-porous particulates are ceramics as well as organic polymeric materials, such as polyolefins.

Suitable chemical treatment agents include scale inhibitors, corrosion inhibitors, paraffin inhibitors, demulsifiers, gas hydrate inhibitors, flocculating agents, asphaltene dispersants as well as mixtures thereof. Scale inhibitors, corrosion inhibitors and paraffin inhibitors, such as wax crystal modifiers, have particular applicability with the non-spherical particulates.

The composite of chemical treating agent and non-spherical particulates may be made by placing the non-spherical particulates in the desired chemical treating agent and then allowing the chemical treatment agent to at least partially fill or enter the particulate either by capillary action or by the aid of a vacuum. An exemplary procedure is to place the non-spherical particulate in a dilute solution of the chemical treatment agent and allow the chemical treatment agent to fill the hollow inner area of the particulate. The at least partially filled non-spherical particulate is then dried. The non-spherical particulates are then sieved through an appropriate mesh size screen to separate out individual particulates.

Once the non-spherical particulates are placed into the fracture, the chemical treatment agent is slowly released as the oil and/or natural gas passes around and through the non-spherical particulate. The rate of release is based on the chemical treatment agent, the temperature of the well, the flow rate of hydrocarbons, the percentage of water in the effluent, etc. The chemical treatment agent slowly dissolves as in a time-release mechanism. Gradual dissolution of the chemical treatment agent insures that the chemical treatment agent is available to the hydrocarbon for extended periods of time. As a result, the chemical treatment agent is available for chemical modification of the deposited materials contained in the produced fluids within the wellbore and/or subterranean formation.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Example 1

This Example illustrates changes in porosity in a birch wood proppant pack when at least a portion of spherical proppant of 12 to 13 mm diameter was replaced with non-spherical proppant. The non-spherical birch wood was rod-shaped or cylindrical-shaped and had a diameter ranging from about 9 mm to about 10 mm and was about 50 mm long.

The measured specific gravity of the birch wood (spheres and rods) was 0.671 (+/−0.039) (compared to a specific gravity of birch of 0.670, reported in the literature). The bulk density of the two wood shapes was determined by filling a measuring cylinder with the material to the 200 ml mark. The bulk density, mass/volume, and porosity were then determined.

Spherical Birch
Bulk density of spheres=0.331 g/cc (+/−0.000)
Porosity=(1−0.331/0.670)×100=50.6%
Rod-Shaped Birch
Bulk Density of rods=0.229 g/cc (+/−0.006)
Porosity=(1−0.229/0.670)×100=65.8%
A 50:50 and 75:25 by weight mixture of spherical birch: rod-shaped birch were then prepared and the bulk density of the mixtures were then determined as above.
50:50 Mixture
Bulk density=0.280 g/cc (+/−0.003)
Porosity=(1−0.280/0.670)×100=58.2%
75:25 Mixture
Bulk density=0.300 g/cc (+/−0.001)
Porosity=(1−0.300/0.670)×100=55.2%

These results demonstrate that the porosity of a proppant pack composed of rod-shaped proppant is greater than the porosity of a proppant pack composed of spherical proppant. The results also demonstrate that the porosity of a spherical proppant pack may be increased by the addition of non-spherical proppant to the proppant pack. In this case, the porosity increased to 58.2% from 50.6% when 50 weight percent of spherical proppant in the pack was replaced with rod-shaped proppant. The addition of 25 weight percent of rod-shaped proppant to the spherical proppant caused a porosity increase from 50.6% to 55.2%. Since the spheres and rods have the same specific gravity, the porosity increase is the result of changes in the packing structure caused by the substitution of spherical-shaped proppant with rod-shaped proppant. As particles deviate from spherical to a more elongated shape, the pack porosity of the resulting proppant pack increases. The Carmen-Kozeny Equation relates permeability to porosity through pore geometric factors, such as tortuosity and surface area. Since permeability is a power law function of porosity by this equation, even a small increase in porosity translates into a significant increase in permeability.

Example 2

This Example illustrates changes in porosity in a 20/40 bauxite proppant pack when at least a portion of ceramic proppant is replaced with aluminum needles. The aluminum needles were cylindrical and had a diameter ranging from about 0.5 mm to about 0.75 mm and were about 2 mm to 4 mm long.

The measured specific gravity of the bauxite proppant was 2.728 (+/−0.005). The measured specific gravity of the uncoated aluminum needles was 2.695 (+/−0.013). Bulk density was determined in accordance with the procedure of Example 1 above.
20/40 Bauxite Ceramic
Bulk density=1.590 g/cc (+/−0.000)
Porosity=(1−1.590/2.728)×100=41.7%
Uncoated Aluminum Needles
Bulk Density=1.030 g/cc (+/−0.001)
Porosity=(1−1.030/2.695)×100=61.8%
A 50:50, 75:25 and 90:10 by weight mixture of 20/40 bauxite ceramic:uncoated aluminum needles were then prepared and the bulk density of the mixtures were then determined as above.
50:50 Mixture
Bulk Density=1.341 g/cc (+/−0.008)
Calculated specific gravity=2.711
Porosity=(1−1.341/2.711)×100=50.5%
75:25 Mixture
Bulk Density=1.469 g/cc (+/−0.001)
Calculated specific gravity=2.720
Porosity=(1−1.469/2.720)×100=46.0%
90:10 Mixture
Bulk Density=1.546 g/cc (+/−0.003)
Calculated specific gravity=2.725
Porosity=(1−1.546/2.725)×100=43.3%

These results demonstrate that the porosity of a proppant pack composed of uncoated aluminum needles is greater than the porosity of a proppant pack composed of only 20/40 bauxite ceramic. The results also demonstrate that the porosity of a 20/40 bauxite ceramic proppant pack may be increased by the addition of uncoated aluminum needles to the proppant pack; the greater the amount of uncoated aluminum needles in the proppant pack, the greater the porosity of the proppant pack. Since the aluminum needles and the bauxite ceramic have almost the same specific gravity, the porosity increase is the result from changes in the packing structure caused by the substitution of the aluminum needles. Since permeability is a power law function of the Carmen-Kozeny Equation, even only a small amount of aluminum needles renders an increase in porosity of the proppant pack and thus the permeability.

Example 3

Conductivity tests were performed according to a modified API RP 61 (1$^{st}$ Revision, Oct. 1, 1989) using an API conductivity cell with Ohio sandstone wafer inserts to simulate the producing formation. About 63 g of a multilayer pack of two types of ceramic rods (at 100%) were tested. Ceramic A consisted of cylindrical particulates ranging in diameter size from about 0.75 mm to about 1.0 mm and about 2 to about 4 mm long. Ceramic B consisted of cylindrical particulates ranging in size from about 0.5 to about 0.75 mm and a length of from about 2 to about 4 mm. Also tested was a 85:15 by weight blend of the ceramic rods with a 20/40 spherical ceramic proppant. A 100% pack of 20/40 spherical ceramic proppant was also tested for comparison. The conductivity cell was then placed on a press while stress was applied at 100 psi/minute until the target stress and temperature were reached. Fluid was then allowed to flow through the test pack maintaining Darcy flow. The differential pressure was measured across 5 inches of the pack using a "ROSEMOUNT" differential pressure transducer (#3051C). Flow was measured using Micromotion mass flow meters and data points were recorded every 2 minutes for 50 hours. An Isco 260 D programmable pump applied and maintained effective closure pressure. Experimental conditions were as follows:

Temperature: 121° C.

Closure Pressure (psi): 1000-8000

Fluid pressure (psi): 300

Figure 2:
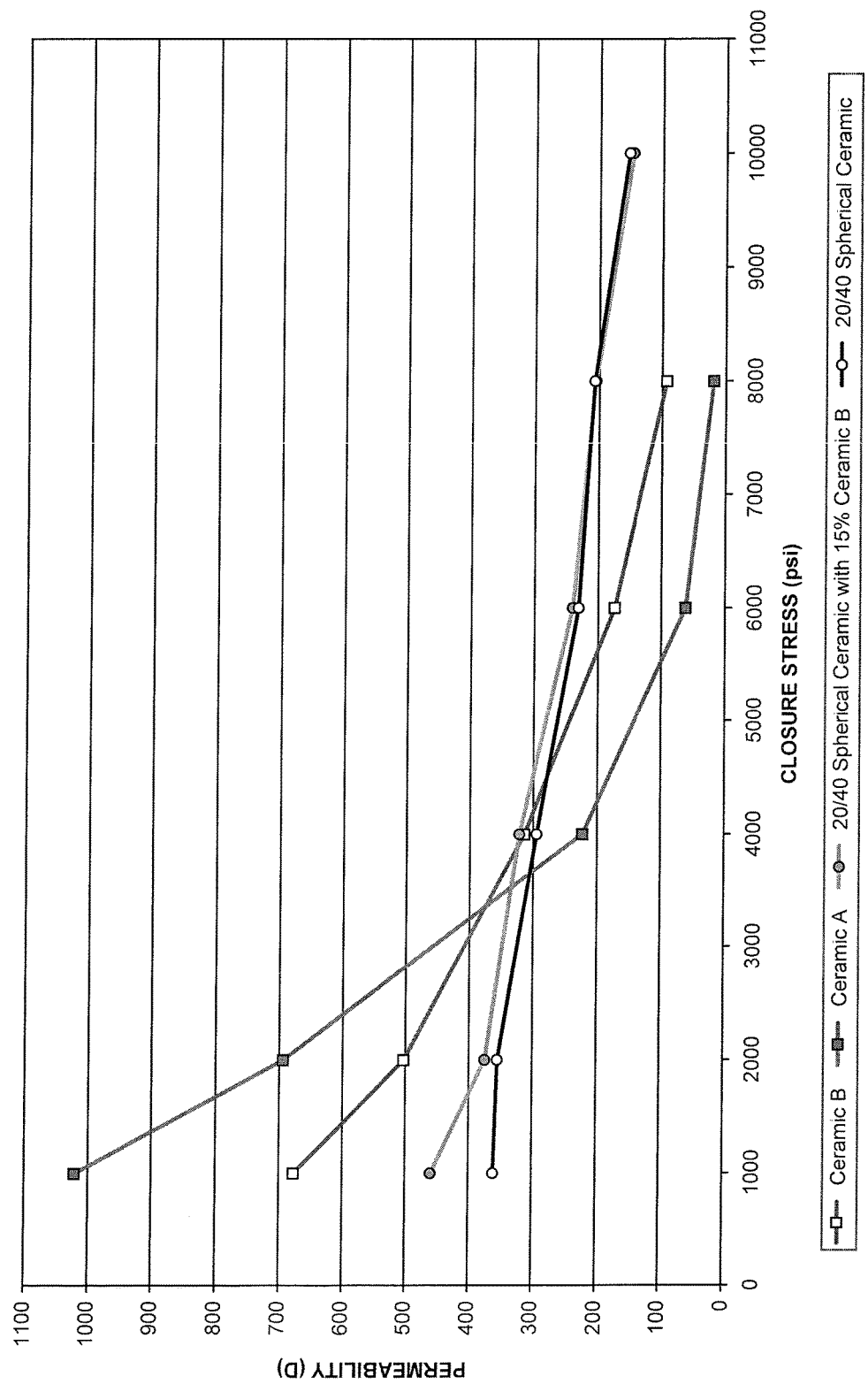
FIG. 2 compares the permeability differences between proppant packs composed of non-spherical particulates versus spherical particulates.

Tables I and II illustrate the data for two types of 100% ceramic rod proppant packs. Table III represents data from a pack with a 85:15 blend of a typical 20/40 spherical ceramic proppant and one of the ceramic rods. Table IV represents the base line data for pack with 100% of the 20/40 spherical ceramic proppant. Further, the conductivity and permeability data are graphically displayed in FIG. 1 and FIG. 2, respectively.

TABLE I

Long-Term Conductivity, 100% Ceramic A at 250° F. and 2 lb/ft.$^2$

| TIME, hours | STRESS, Psi | CONDUCTIVITY, mDft | PERMEABILITY, D | WIDTH, mm |
|---|---|---|---|---|
| 0 | 1000 | 19859 | 1047 | 5.78 |
| 50 | 1000 | 19333 | 1021 | 5.77 |
| 0 | 2000 | 14164 | 792 | 5.45 |
| 50 | 2000 | 12269 | 694 | 5.39 |
| 0 | 4000 | 5074 | 316 | 4.89 |
| 50 | 4000 | 3456 | 223 | 4.73 |
| 0 | 6000 | 1464 | 102 | 4.36 |
| 50 | 6000 | 844 | 62 | 4.16 |
| 0 | 8000 | 529 | 40 | 4.01 |
| 50 | 8000 | 240 | 19 | 3.86 |

TABLE II

Long-Term Conductivity, 100% Ceramic B at 250° F. and 2 lb/ft.$^2$

| TIME, Hours | STRESS psi | CONDUCTIVITY mDft | PERMEABILITY D | WIDTH mm |
|---|---|---|---|---|
| 0 | 1000 | 11000 | 681 | 4.92 |
| 50 | 1000 | 10932 | 677 | 4.92 |
| 0 | 2000 | 8950 | 580 | 4.70 |
| 50 | 2000 | 7688 | 503 | 4.66 |
| 0 | 4000 | 5782 | 404 | 4.36 |
| 50 | 4000 | 4404 | 314 | 4.28 |
| 0 | 6000 | 3056 | 228 | 4.09 |
| 50 | 6000 | 2253 | 174 | 3.94 |
| 0 | 8000 | 1711 | 137 | 3.80 |
| 50 | 8000 | 1132 | 93 | 3.71 |

TABLE III

Long-Term Conductivity. 15:85 Mixture of Ceramic B: 20/40 Spherical Ceramic Proppant, 250° F. and 2 lb/ft.$^2$

| TIME, hours | STRESS, psi | CONDUCTIVITY, mDft | PERMEABILITY, D | WIDTH, mm |
|---|---|---|---|---|
| 0 | 1000 | 7082 | 467 | 4.62 |
| 50 | 1000 | 6935 | 460 | 4.60 |
| 0 | 2000 | 5790 | 386 | 4.57 |
| 50 | 2000 | 5596 | 375 | 4.55 |
| 0 | 4000 | 5526 | 372 | 4.53 |
| 50 | 4000 | 4564 | 322 | 4.32 |
| 0 | 6000 | 4197 | 298 | 4.30 |
| 50 | 6000 | 3266 | 240 | 4.15 |
| 0 | 8000 | 3066 | 233 | 4.01 |
| 50 | 8000 | 2627 | 205 | 3.91 |
| 0 | 10000 | 2049 | 165 | 3.78 |
| 50 | 10000 | 1770 | 147 | 3.68 |

TABLE IV

Long-Term Conductivity, 100% 20/40 Spherical Ceramic Proppant, 250° F. and 2 lb/ft.$^2$

| TIME, Hours | STRESS psi | CONDUCTIVITY mDft | PERMEABILITY D | WIDTH mm |
|---|---|---|---|---|
| 0 | 1000 | 5684 | 391 | 4.43 |
| 50 | 1000 | 5224 | 361 | 4.41 |
| 0 | 2000 | 5130 | 359 | 4.36 |
| 50 | 2000 | 5048 | 355 | 4.33 |
| 0 | 4000 | 4189 | 296 | 4.31 |
| 50 | 4000 | 4022 | 295 | 4.16 |
| 0 | 6000 | 3805 | 281 | 4.13 |
| 50 | 6000 | 3033 | 231 | 4.01 |
| 0 | 8000 | 2620 | 207 | 3.86 |
| 50 | 8000 | 2583 | 207 | 3.81 |
| 0 | 10000 | 2272 | 154 | 3.68 |
| 50 | 10000 | 1839 | 154 | 3.64 |

From the foregoing, it will be observed that numerous variations and modifications may be effected without departing from the true spirit and scope of the novel concepts of the invention.

What is claimed is:

1. A method of stimulating production of hydrocarbons from a subterranean formation penetrated by a wellbore, comprising introducing into the wellbore a proppant of a non-spherical ceramic coated with a resin or a glazing material and forming a proppant pack in the formation, wherein the proppant pack comprises a closed-packed structure of particulates of the proppant and further wherein the particulates of the proppant are in communication with each other.

2. The method of claim 1, wherein the non-spherical ceramic is porous.

3. The method of claim 2, wherein the non-spherical ceramic is coated with a resin which is permeable or semi-permeable to fluids produced from the wellbore.

4. The method of claim 1, wherein the non-spherical ceramic is non-porous.

5. The method of claim 4, wherein the non-spherical ceramic is coated with a resin which is permeable or semi-permeable to fluids produced from the wellbore.

6. The method of claim 1, wherein the non-spherical ceramic is composed of fired kaolinitic particles.

7. The method of claim 1, wherein the non-spherical ceramic is bauxite.

8. The method of claim 1, wherein the non-spherical ceramic is a natural ceramic.

9. The method of claim 8, wherein the natural ceramic is selected from the group consisting of volcanic rocks, perlite and porous lavas and mixtures thereof.

10. The method of claim 8, wherein the natural ceramic is pumice, Hawaiian Basalt, Virginia Diabase, Utah Rhyolite or a mixture thereof.

11. The method of claim 1, wherein the non-spherical ceramic is treated with a glazing material.

12. The method of claim 1, wherein the non-spherical ceramic has an apparent specific gravity less than or equal to 2.0.

* * * * *